Aug. 28, 1956
J. BAXTER, JR
2,760,411
FOURDRINIER MACHINE BREAST ROLL
SUPPORT AND TABLE STRUCTURE
Filed Dec. 29, 1951
6 Sheets-Sheet 1
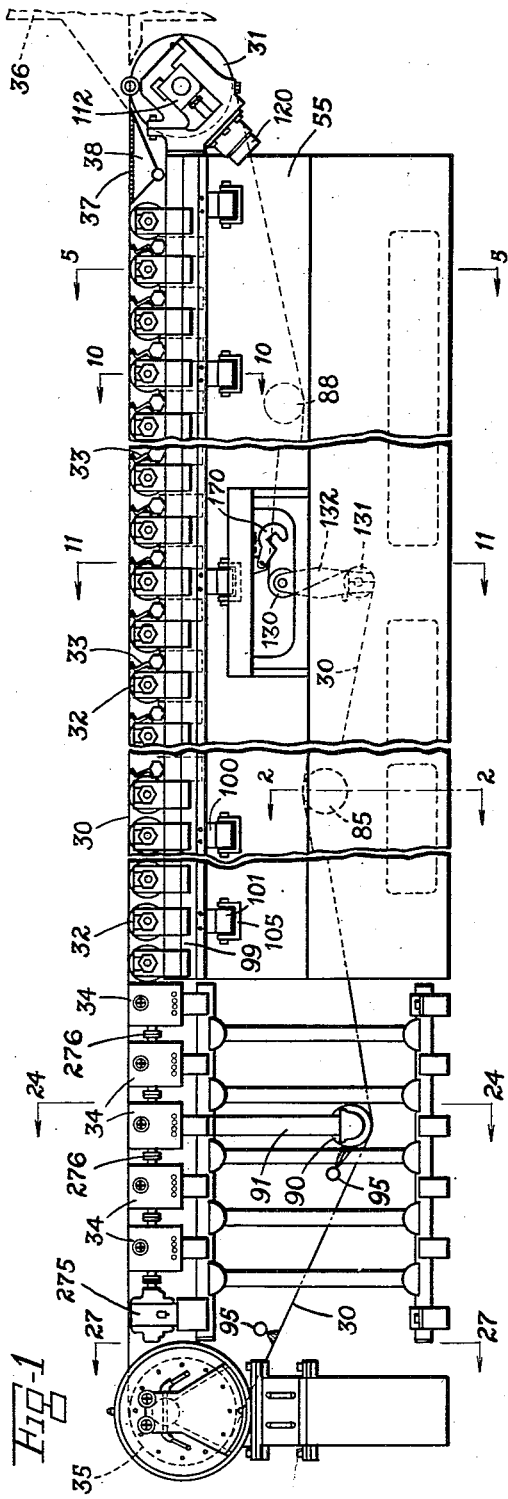
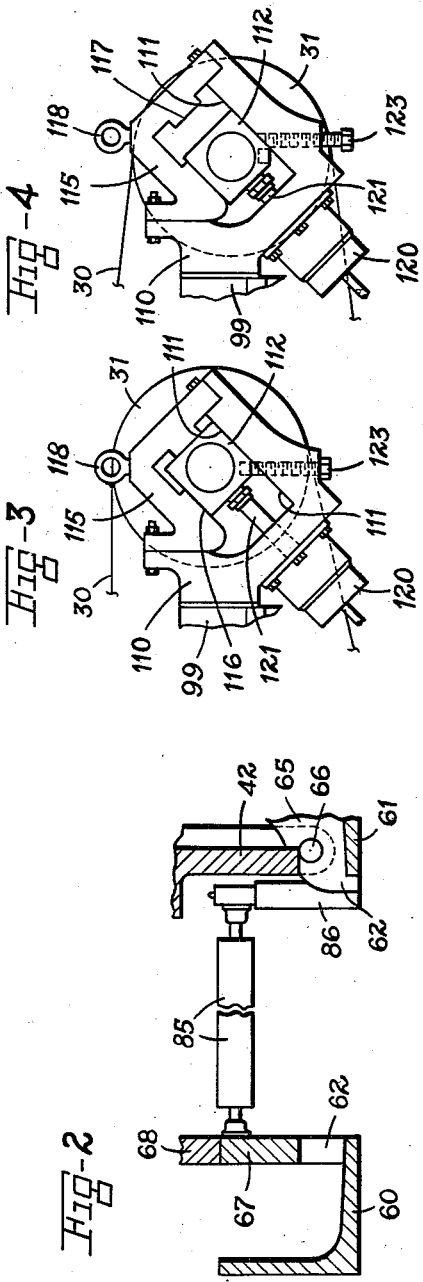
INVENTOR.
JOSEPH BAXTER Jr.
BY
Marechal Biebel French & Bugg
ATTORNEYS

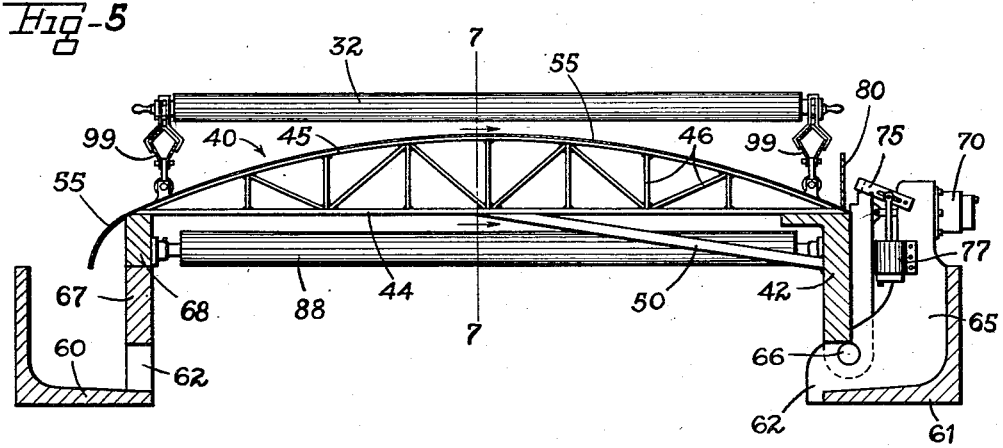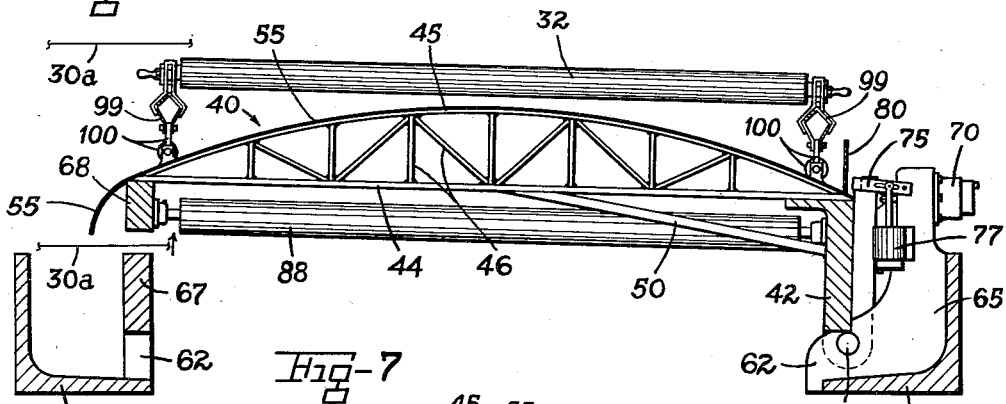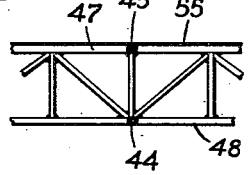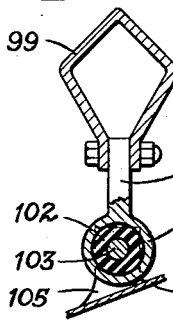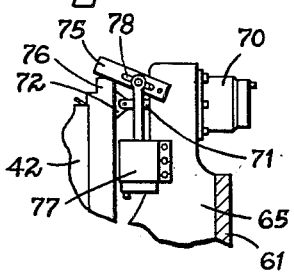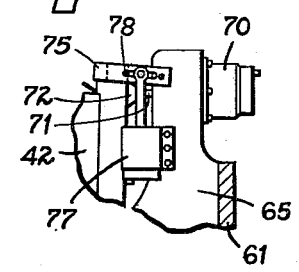

Aug. 28, 1956 J. BAXTER, JR 2,760,411
FOURDRINIER MACHINE BREAST ROLL
SUPPORT AND TABLE STRUCTURE
Filed Dec. 29, 1951 6 Sheets-Sheet 3
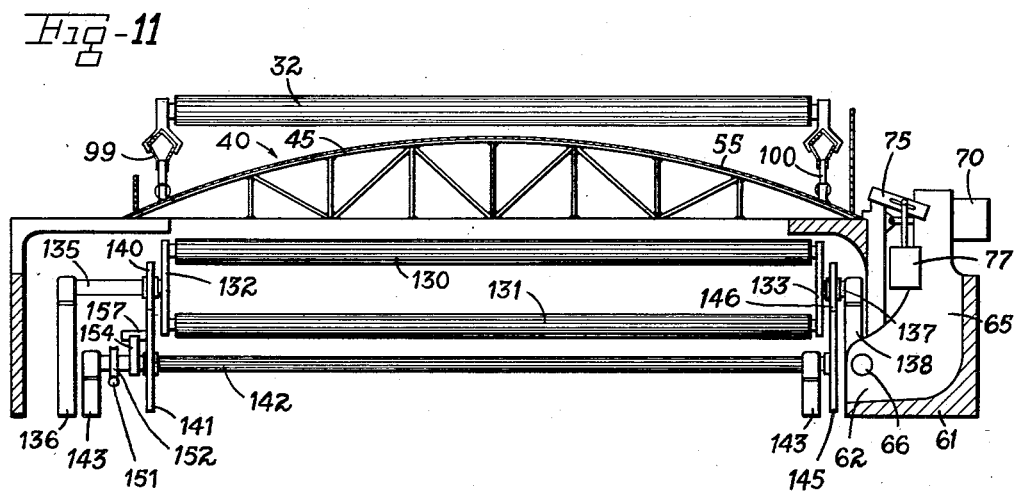
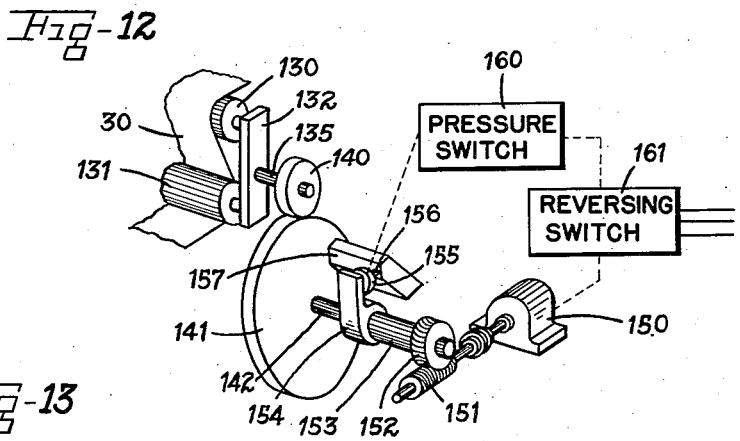
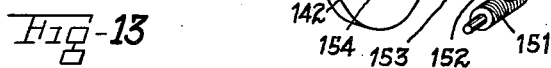
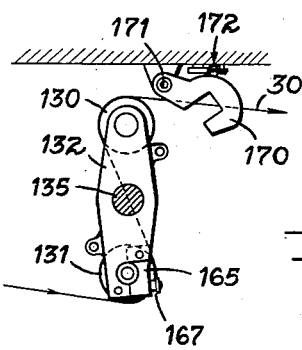
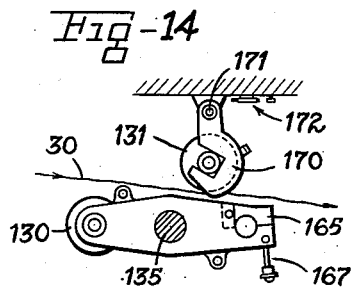
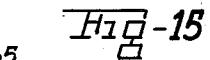
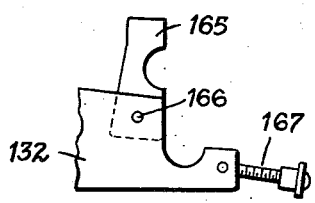
*INVENTOR.*
JOSEPH BAXTER JR.
BY
Marechal Biebel French & Bugg
*ATTORNEYS*

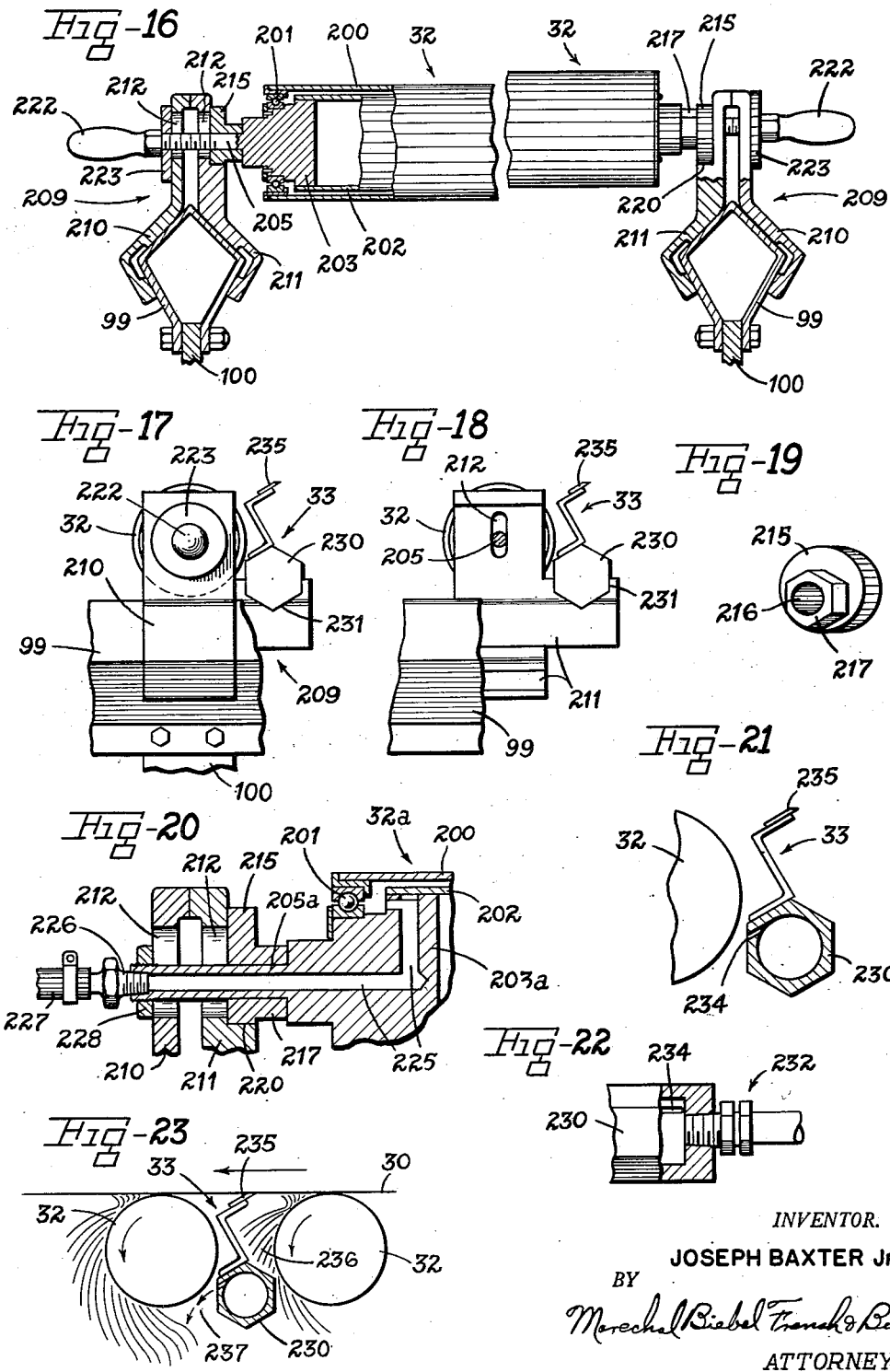

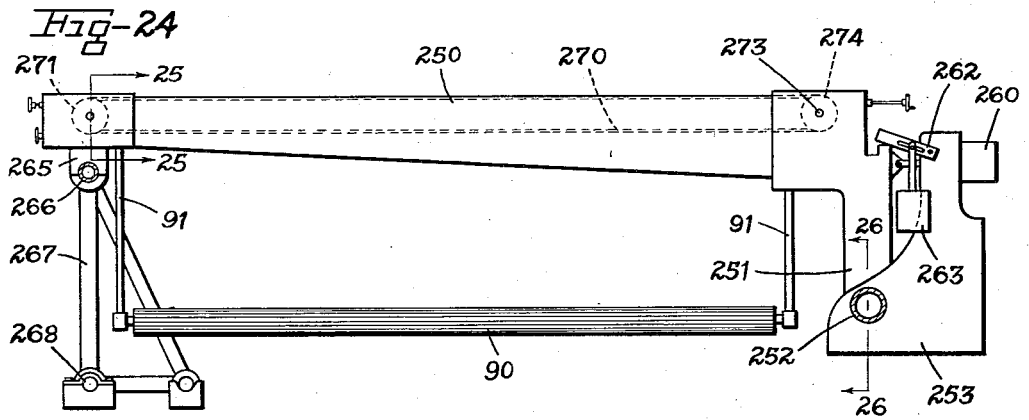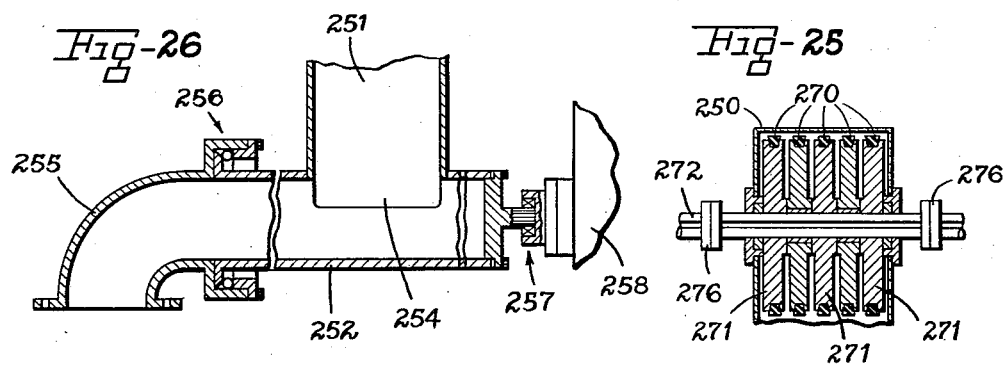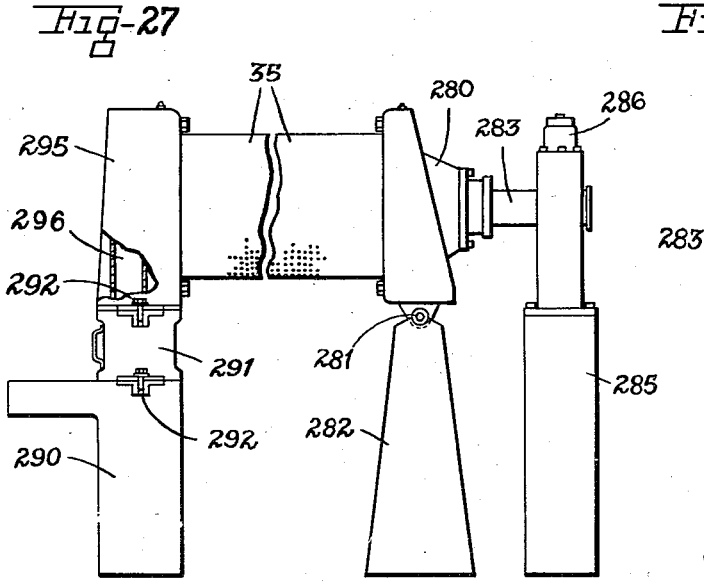

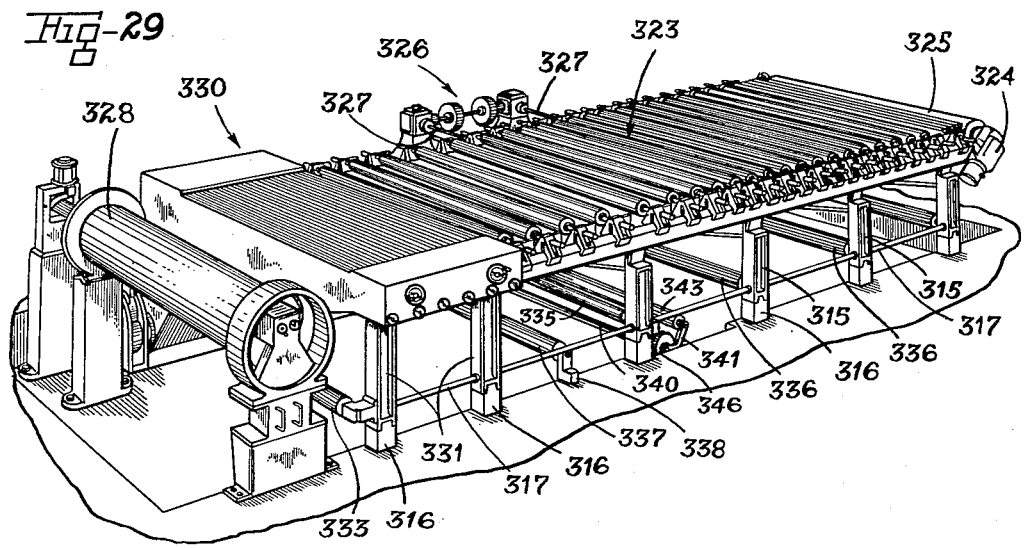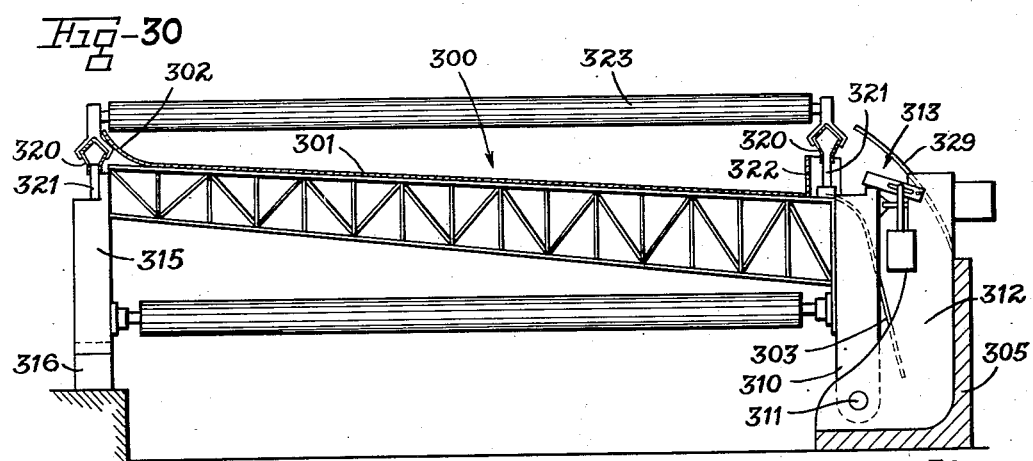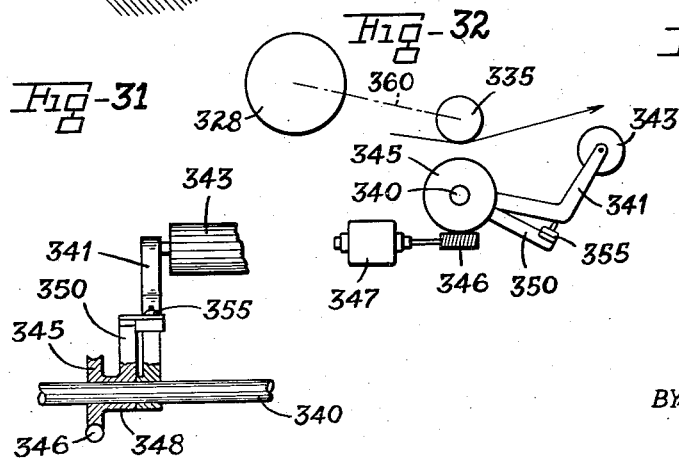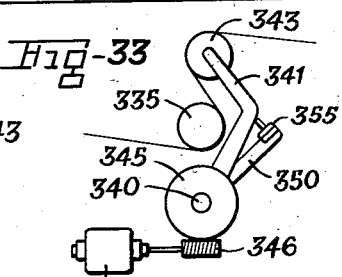

United States Patent Office 2,760,411
Patented Aug. 28, 1956

2,760,411

FOURDRINIER MACHINE BREAST ROLL SUPPORT AND TABLE STRUCTURE

Joseph Baxter, Jr., Franklin, Ohio, assignor to The Black-Clawson Company, Hamilton, Ohio, a corporation of Ohio Application December 29, 1951, Serial No. 264,088

5 Claims. (Cl. 92—44)

This invention relates to a Fourdrinier paper machine.

It is generally a primary object of the invention to provide a Fourdrinier paper machine which is of lightweight and rigid construction eliminating a major proportion of the weight and many of the component parts of conventional Fourdrinier machines of present day manufacture without sacrificing size or capacity, which may therefore be advantageously fabricated of more desirable materials for improved overall construction and maintenance at economical cost, and which in addition may readily be constructed with all portions of the wire section mounted in cantilever fashion for tilting as a unit to facilitate wire changing.

More specifically it is an object of the invention to provide a Fourdrinier paper machine incorporating a control arrangement for the water draining from the newly formed paper web such that the water is directed outwardly to one or both sides of the machine from between the top and bottom runs of the wire without the necessity of saveall trays and the like, and thus to eliminate a large proportion of the weight of conventional Fourdrinier machines represented by such trays and their supporting structure with resulting economy of manufacture and maintenance as well as generally improved operation.

In one embodiment of the invention, the major portion of the wire section which supports the table rolls comprises a plurality of spaced truss members extending transversely of the direction of wire travel and connected by simple reinforcing members to form a main frame of rigid bridge-like construction which may at the same time be comparatively light in weight for economical manufacture as well as convenient operation. The truss members of the frame cooperate to support a covering roof of sheet metal formed at its sides to overhang the front and back of the machine in such manner as to deliver the white water draining from the top run of the wire and paper web thereon away from the bottom run of the wire. The truss frame also forms a convenient support for the table rolls and cooperating deflector members for stripping the table rolls of water and thus causing all water draining from the wire as it crosses the table rolls to fall to the roof, and this entire structure is readily supported at one side by a horizontal pivotal mounting on the base of the machine and forms a rigid unit which may be tilted about its pivotal mounting for support in cantilever fashion across its entire width for convenient wire changing.

It is accordingly an object of the invention to provide a wire section of a Fourdrinier paper machine of cantilever type truss roof construction wherein multiple truss members extending transversely of the wire in spaced relation longitudinally of the machine cooperate to form a lightweight but highly rigid and strong main frame for supporting both the table rolls and the breast roll and which is therefore of such character as to be readily mounted at one side of the machine by a pivotal mounting providing for tilting as a unit in cantilever fashion for changing the wire.

Another object is to provide a Fourdrinier paper machine having a wire section including a truss roof as outlined above wherein a lightweight roof member of sheet material is mounted on top of the trusses and below the table rolls and is inclined downwardly towards one or both sides of the machine to receive water draining from the table rolls and to direct this water laterally of the machine for ready discharge to the pit without passing through the return flight of the wire below the machine.

The invention has special relation to the control of tension in the Fourdrinier wire, from the standpoint both of facilitating wire changing and also of maintaining controlled tension in the wire during operation, and one of the objects of the invention is to provide a Fourdrinier paper machine having an adjustable tensioning device for the wire which incorporates a continuously operable control for measuring the tension in the wire and a drive automatically responsive to the measuring control in such manner as to correct during operation of the machine for variations in tension from a desired maintained substantially constant tension.

An additional object is to provide an automatic tension controlling device for the wire of a Fourdrinier paper machine which is constructed and arranged for ready shifting between an operating position wherein it establishes and maintains desired tension in the wire and a release position such that not only is it free of the wire but also in its movement to the release position, it provides sufficient slack in the wire for ready removal and changing thereof without requiring the release or removal of other parts of the machine.

It is also an object of the invention to facilitate wire changing on a Fourdrinier paper machine by means of an improved and simple mounting for the breast roll in which the bearing housings for the roll are supported for sliding movement in an inclined plane such that the roll will move downwardly and forwardly to give adequate clearance for ready changing of the wire, and it is also an object of the invention to provide such a mounting arrangement wherein the sliding movement of the breast roll into and out of operative position may be effected and controlled by the application of fluid pressure to the bearing housings.

The invention is further directed to the provision of improved control over the drainage from the newly formed paper web on the wire of a Fourdrinier paper machine, and one of the objects of the invention is to provide a construction of table rolls and cooperating deflectors for a Fourdrinier paper machine which will effect drainage of the web at a high rate in order to remove as much water as possible from the web during its passage over the table rolls in machines operating at the high speeds of present day practice and which at the same time is gentle in action in order to avoid damage to the newly formed web.

This object is achieved in accordance with the invention by providing a deflector unit for use with a table roll which not only serves to deflect water thrown off by the adjacent roll in such manner as to prevent it from striking others of the table rolls and possibly being retransferred to the wire, but which also incorporates an air blast acting as a doctor to remove the surface film of water from its associated roll and at the same time to create gentle suction through the wire inducing further drainage in the areas between table rolls.

It is accordingly an object of the invention to provide a Fourdrinier paper machine incorporating deflector units for cooperation with the table rolls which are of such construction and arrangement in the machine as to assure efficient drainage of the newly formed paper web with accompanying gentle action with respect to the web by drawing the water drained from the web away from the wire and table rolls in such manner as to prevent possible retransfer thereof to the wire and resulting interference with further drainage and by doctoring the table rolls to remove surface water therefrom while at the same time cooperating with the wire and rolls to create suction through the wire inducing increased drainage from the web.

Still another object of the invention is to provide an improved and simplified mounting for the table rolls of a Fourdrinier paper machine in which each roll is a tubular member mounted for free turning on a fixed shaft, and in which the mounting for the shaft incorporates an eccentric mechanism for quickly and easily adjusting the vertical position of the shaft and roll with respect to the wire.

Other objects and advantages of the invention will be apparent from the following description, the accompanying drawings and the appended claims.

In the drawings—

Fig. 1 is a side elevational view illustrating the wire section of a Fourdrinier paper machine constructed in accordance with the present invention;

Fig. 2 is a fragmentary section on the line 2—2 of Fig. 1;

Fig. 3 is an enlarged fragmentary view in side elevation showing the mounting arrangement for the breast roll and with the roll in its raised or operative position;

Fig. 4 is a view similar to Fig. 3 showing the breast roll in its release position;

Fig. 5 is a section on the line 5—5 of Fig. 1 showing the general construction of the main supporting framework of the machine;

Fig. 6 is a view similar to Fig. 5 showing the wire section tilted for wire changing;

Fig. 7 is a fragmentary section on the line 7—7 of Fig. 5;

Figs. 8 and 9 are enlarged fragmentary views showing the controlling and locking mechanism for tilting the wire section, Fig. 8 showing the parts released as in Fig. 5, and Fig. 9 showing the parts in their positions with the machine tilted as shown in Fig. 6;

Fig. 10 is an enlarged fragmentary section showing the mounting arrangement for one of the shake rails which support the table rolls, the view being in section approximately on the line 10—10 of Fig. 1;

Fig. 11 is a section on the line 11—11 of Fig. 1 showing the arrangement of stretch rolls for tensioning the forming wire;

Fig. 12 is a fragmentary and somewhat diagrammatic view in the nature of a perspective showing a drive for the stretch rolls;

Fig. 13 is a fragmentary view on a larger scale showing the position of the stretch rolls during operation of the machine;

Fig. 14 is a view similar to Fig. 13 showing the position of the stretch rolls during wire changing;

Fig. 15 is a further enlarged fragmentary view showing a detail of the stretch roll mechanism;

Fig. 16 is an enlarged fragmentary view partly in side elevation and partly broken away in vertical section showing one of the table rolls and its supporting structure, and also illustrating the adjustable mounting for the table roll with the left hand side of the view showing the roll in its lowermost position and the right hand side in its uppermost position;

Fig. 17 is a fragmentary view looking from left to right in Fig. 16 and showing the mounting for the table roll;

Fig. 18 is a view similar to Fig. 17 with parts removed to illustrate structural details;

Fig. 19 is a detail view in perspective showing one of the adjusting cams for the table rolls;

Fig. 20 is a fragmentary sectional view showing a modified construction of table roll;

Figs. 21 and 22 are fragmentary views illustrating the construction of one of the water deflectors for the table rolls;

Fig. 23 is a diagrammatic view illustrating the operation of the table rolls and one of their associated water deflectors;

Fig. 24 is a section on the line 24—24 of Fig. 1 illustrating one of the suction boxes and its supporting structure;

Fig. 25 is a fragmentary section on the line 25—25 of Fig. 24 illustrating internal details of the suction box;

Fig. 26 is a section on the line 26—26 of Fig. 24 illustrating the pivotal mounting of one of the suction boxes;

Fig. 27 is a fragmentary section on the line 27—27 of Fig. 1 showing the suction couch roll and its supporting structure;

Fig. 28 is a fragmentary view looking from right to left in Fig. 27 to show the tilting mechanism for the couch roll;

Fig. 29 is a perspective view of the wire section of a Fourdrinier machine embodying a modified construction in accordance with the present invention;

Fig. 30 is a transverse vertical section through the paper machine of Fig. 29;

Fig. 31 is a fragmentary view looking from right to left in Fig. 33 and partly broken away showing a portion of the wire tensioning mechanism of the machine of Fig. 29; and Figs. 32 and 33 are diagrammatic views in side elevation illustrating the operation of the wire tensioning mechanism of Fig. 31.

Referring to the drawings, which illustrate preferred embodiments of the invention, Fig. 1 shows the general arrangement of the wire section of a Fourdrinier paper machine including the continuous forming wire 30, the breast roll 31, table rolls 32 provided with water deflectors 33, suction boxes 34 and the suction couch roll 35. The stock inlet or slice is indicated fragmentarily at 36, and similarly the usual forming board and its saveall tray are indicated at 37 and 38 respectively. The main frame structure supporting the breast roll and table rolls includes a plurality of truss members 40, which extend transversely of the direction of wire travel in spaced relation longitudinally of the machine, and each truss member 40 has a supporting post 42 at the back of the machine. The suction boxes are supported separately from the truss frame but are connected therewith as described hereinafter.

The truss members 40 are shown as formed of main cross members 44, top members 45 and a plurality of diagonally and vertically arranged sections 46. These structural members may be welded together in any suitable truss design, with the parts 44 and 46 being formed of tubular sections of stainless steel or other suitable material providing adequate strength and rigidity together with lightness in weight, and with the parts 45 formed of similar material in strap form for more convenient fabrication. Longitudinal bracing is provided by means of additional sections 47 and 48 welded between adjacent trusses as shown in Fig. 7, the number of such longitudinal reinforcements depending in large measure upon the width of the machine, and these longitudinal braces may also connect the suction boxes together and to the truss frame. Additional reinforcing members 50 may be welded as shown between approximately the midpoint of each truss and the associated post 42 at the back of the machine, these reinforcements 50 being arranged at an acute angle to the main cross members 44. A covering roof 55 of stainless steel or other suitable sheet material is in turn supported on the truss members, and it is formed of curved section with its side portions inclined downwardly in overhanging relation with the ends of the truss members.

The supporting structure of the machine includes a pair of base members 60 and 61 which extend along the front and back of the machine similarly to the usual sole plates but which are shown as formed of generally trough shape in section to define trough means for receiving water draining from the sides of the roof 55, and each base member has a plurality of openings 62 for directing water therefrom into the usual wire pit (not shown). With this construction, all the water draining from the newly formed web on the upper run of the wire as it passes from the breast roll to the suction boxes is received initially on the upper surface of roof 55. This water therefore drains off at the side of the machine so that it is unnecessary to provide saveall trays or like members between the upper and lower runs of the wire such as are usually employed to prevent contamination of the lower run by fiber carried with the white water from the web on the upper run, and the water is discharged laterally from between the upper and lower runs of the wire. Also, this roof arrangement provides for continuous drainage over lips extending the full length of the table roll section and thus gives maximum capacity for rapid and complete drainage. In addition, with the drainage spread over the full area of the table section, the resulting film of water is correspondingly thin to reduce the tendency for accumulation of entrapped air in the return water system, and also the roof is easy to clean by simple washing with a hose or the like.

In the usual Fourdrinier construction, the saveall trays and their supporting structure constitute a major proportion of the total weight of the wire section, and since these parts are unnecessary in the present machine, it is also possible and practicable in accordance with the invention to construct this section of the machine of substantially lighter parts without sacrificing any necessary strength or rigidity. Also with this truss roof arrangement described, materials usually considered too costly for this purpose but which are nevertheless highly desirable, such as stainless steel, can be used at economical cost because of the greatly reduced weight and requirements with respect to quantity of material.

This greatly lightened overall structure in accordance with the invention is also readily adaptable to a cantilever mounting for the wire section facilitating wire changing. Referring to Figs. 2, 5 and 6, the rear base member 61 includes a plurality of rib-like stand portions 65, and the posts 42 at the back of the machine are secured at their lower ends to a shaft 66 journaled in these stands 65 and extending the full length of the machine. A pad portion 67 of the front base member 60 serves in the operative position of the machine as the support for the plurality of blocks 68 which are secured to the front ends of the truss members 40, and the entire frame can thus pivot with the shaft 66 to raise the blocks 68 away from the pad 67 and so that the front of the frame is supported in cantilevered position as shown in Fig. 6.

Movement of the frame for wire changing as described is shown as effected by a plurality of fluid pressure cylinders 70 mounted at the back of an upstanding portion of each of the stands 65, and each having a piston rod 71 connected with a bracket 72 at the back of the adjacent post 42. The arrangement is such that when pressure is applied to cylinders 70, the posts 42 are pulled rearwardly of the machine so that the entire main frame rocks with the shaft 66, raising blocks 68 away from pad 67, and in this position the wire is readily removed and a new wire mounted in place from the front of the machine as indicated diagrammatically at 30a in Fig. 6. In order to cause the entire frame to move as a unit and to prevent premature movement of one or more of the posts 42, the latter may be bolted or otherwise secured to shaft 66 so that this shaft will act as a torque rod.

The frame may be readily held in raised position by means such as a loop-shaped latch member 75 (Figs. 8 and 9) pivoted to each stand 65 and adapted to slip over the cooperating latch portion 76 at the upper end of the adjacent post 42. Disengagement of each latch 75 is shown as effected by means of a fluid pressure cylinder 77 carried by stand 65 and having its piston rod pivoted in a slot 78 in the latch 75. The cylinders 77 may be double acting to operate the latches in both directions, or they may be single acting to disengage the latches, with engagement of the latches being effected by gravity after the frame has been raised a sufficient distance. A shield 80 is shown as secured to the roof 55 adjacent each of the posts 42 to protect these parts against splashing by the water draining from the roof.

Fig. 1 shows the general location of the several guide rolls for the lower run of the wire 30. The guide roll 85 is mounted as shown in Fig. 2 on the base member 60 at the front of the machine and on a stand 86 carried by the other base member 61, and if desired this roll may be supported in conjunction with a suitable wire guide for movement angularly of the direction of travel of the wire to maintain travel of the wire in the proper direction, as shown for example in Staege Patent No. 2,484,473 issued October 11, 1949, to the assignee of this application. One or more inside rolls 88 above the lower run of the wire are carried by the posts 42 and blocks 68 for tilting with the truss roof, as best seen in Figs. 5 and 6. The guide roll 90 next to the couch is also an inside roll and is carried by supports 91 extending downwardly from one of the suction boxes 34 and tiltable therewith as shown in Fig. 24. This provides the important advantage in operation that the wire passes below roll 90 after leaving the couch roll so that any particles of fiber adhering thereto tend to be forced out. This cleaning action is further aided by showers 95 located between roll 90 and the couch roll which promote effective cleaning by maintaining a flooded condition at the nip of roll 90 and the wire.

The breast roll 31 and the table rolls 32 are all carried by a pair of rails 99 which extend the full distance from the breast roll to the suction boxes, and which are adapted for connection to any suitable shaking mechanism (not shown). These rails 99 are shown as of rectangular hollow section for reduced weight, and they have flexible mountings on the truss roof providing for shaking the table rolls. For example, the rails 99 are shown as bolted to the upper ends of a plurality of plates 100 each of which has its lower end welded or otherwise secured to a sleeve 101 mounted by means of an internal rubber sleeve 102 on a bolt or rod 103 which is in turn supported by a yoke-shaped bracket 105 similarly secured to the roof 55, preferably directly above one of the top members 45 for adequate rigidity. This type of mounting unit, in which the rubber sleeve is bonded to both the metal sleeve 101 and the rod 102, provides for the desired vibration of the plates 100 and the parts supported thereby, and similar results are obtainable by constructing the plates 100 as leaf springs having their lower ends fixedly secured in the brackets 105. If desired, the rails 99 may be formed of multiple separate sections each connected with a shaking mechanism for shaking independently of each other.

The breast roll 31 is shown as mounted directly on the shake rails 99 by means of a pair of brackets 110 welded or otherwise secured to the ends of the rails 99 and equipped with means for effecting controlled sliding movement of the breast roll away from the slice to provide sufficient clearance for ready wire changing. Referring to Figs. 3 and 4, each of these brackets includes a surface 111 forming a slideway for the square bearing blocks 112 for the breast roll journals. Each bracket 110 is also provided with a complementary member 115 which is bolted thereto to enclose the bearing blocks 112 and which includes a slideway 116 and a face 117 limiting upward movement of the bearing block, and the members 115 are shown as provided with eye bolts 118 to aid in their removal when it is desired to replace the breast roll.

The sliding movement of bearing blocks 112 in the slideways 111 and 116 is effected and controlled by a pair of fluid pressure cylinders 120 mounted on the brackets 110 and having their piston rods 121 connected to the bearing blocks. Bolts 123 are also threaded in the brackets 110 for engagement with the pad portions on the lower sides of the bearing blocks to lock them in their uppermost position. Thus when it is desired to change the wire, it is merely necessary to release the bolts 123 and permit the breast roll to move downwardly through the sliding movement of its bearing blocks 112 on the slideways 111. After the wire has been changed, the breast roll is returned to its uppermost position by means of cylinders 120 and is locked therein by the bolts 123.

Figs. 11–15 illustrate the construction and operation of the stretch roll arrangement which maintains proper tension in the wire 30 during operation of the machine and also provides slack in the wire for changing. The two stretch rolls 130 and 131 are journaled in a pair of arms 132 and 133 supported at opposite sides of the machine between guide rolls 85 and 88. The arm 132 at the front of the machine is fixed at approximately its center to a shaft 135 which is shown as mounted on a stand 136 or may be mounted directly on the base member 60 similarly to the guide roll 85. The arm 133 is similarly mounted for pivotal movement about its center by means of a shaft 137 carried by a stand 138 on base member 61. The shaft 135 carries a gear 140 meshing with a large gear 141 on a shaft 142 extending across the width of the machine and shown as mounted on the base members by means of stands 143, and at the back of the machine, the shaft 142 carries a large gear 145 meshing with a gear 146 on shaft 137.

During operation of the machine, the wire 30 wraps both of the stretch rolls 130 and 131 as shown in Figs. 1 and 13. Rotation of arms 132 and 133 will cause roll 130 to move about the axis of shafts 135 and 137 in a path passing between rolls 88 and 131, and similarly the path of roll 131 will pass between rolls 85 and 130, thus varying the extent of wrap of the wire on the stretch rolls and correspondingly increasing or decreasing the tension in the wire depending upon the direction of movement of the rolls. A motor operated control is accordingly provided for effecting rotation of the stretch roll arms in response to variations of the tension in the wire in order to maintain substantially constant tension. This control includes a motor 150 driving a worm 151 meshing with a worm gear 152 mounted for free rotation on shaft 142 by means of a sleeve or hub portion 153. The sleeve 153 also carries an arm 154 supporting a small air cylinder 155, and the piston rod 156 from cylinder 155 is positioned to about an arm 157 projecting axially from the gear 141.

It will thus be apparent that if arm 154 moves in clockwise direction as viewed in Fig. 12, it will act through cylinder 155 and rod 156 to force arm 157 and gear 141 similarly in clockwise direction. This movement will be transmitted through gear 140 to cause counterclockwise movement of the stretch roll arms and tightening of wire 30, and correspondingly movement of arm 154 in counterclockwise direction will cause clockwise movement of the stretch roll arms and resulting decrease in the tension of the wire. To control this movement automatically in such manner as to maintain predetermined tension conditions in the wire, a pressure switch 160 is provided which is connected with the cylinder 155 as indicated diagrammatically in Fig. 12 and which in turn controls a reversing switch 161 for motor 150. The switch 160 is adjustable to respond to a change in the pressure in cylinder 155 above or below a predetermined desired range, and since such change will be caused by increase or decrease of the tension in the wire, transmitted through the contact between piston rod 156 and arm 157, when a change occurs the motor 150 will be actuated to effect the proper correcting movement of the stretch roll arms.

Figs. 14 and 15 show the operation of the stretch roll mechanism for releasing the wire for changing. The journals of roll 131 are releasably carried in the arms 132 and 133 by means of a releasable bearing portion 165 pivoted on the arm at 166 and provided with a releasable locking bolt 167, which may also be pivoted to the arm as shown for easy handling. At each side of the machine, a hook 170 is pivoted at 171 to the machine frame and is normally held in retracted position by a suitable releasable latch mechanism indicated diagrammatically at 172. The hooks 170 are so arranged that when they are released and dropped to their downwardly hanging positions they are in position to receive the journals of roll 131 as the stretch roll arms rotate. Thus in order to release the wire for changing, it is merely necessary to rotate the arms sufficiently to deposit the journals of roll 131 in hooks 170, release the bearing portions 165, and then continue the movement of the arms until they are approximately horizontal as shown in Fig. 14. In this position of the parts, the roll 131 is supported from the cantilevered portion of the machine frame while the roll 130 remains supported on the base structure, and the wire is accordingly free for lateral movement as shown in Fig. 14. Then after the wire has been removed and replaced, the reverse operation will return the stretch roll mechanism to its operating position shown in Fig. 13.

This tensioning mechanism for the wire offers outstanding advantages for convenience of wire changing as well as during operation of the paper machine. It is compact and does not require changing of the basic machine frame, and at the same time it provides adequate slack for wire changing without requiring a well or other special structure for receiving the slack after the wire has been tightened on the machine. In addition, since it is constructed for adjustment through a comparatively wide range, the initial length of the wire is not critical, and the stretch rolls can be operated to compensate for a range of wire lengths without adjustment other than the required movement of these rolls to their positions wherein the desired tension in the wire is established.

The table rolls 32 are shown in detail in Figs. 16 to 22 and are of simple construction each including an outer tube 200 forming a tubular shell mounted by means of bearings 201 on a fixedly mounted shaft unit comprising an inner tube 202 having end members 203 secured to each end thereof. Each of the end members 203 includes an axially extending stud portion 205 by which in turn the table roll assembly is mounted on the shake rails 99. This construction of the table rolls offers desirable practical advantages from the standpoint of both simplicity and lightness in weight. Furthermore, since the bearings 201 are required to support only the outer shell or tube 200, the load and resulting wear thereon are comparatively low, providing an extended useful life, and also deflection of the outer tube 200 is held to substantially a minimum so that its upper surface is maintained effectively horizontal to give optimum level support to the wire.

Each of the table rolls is supported by a bracket unit 209 which provides a vertically adjustable mounting on the shake rails 99, and each bracket includes a pair of complementary clamping members 210 and 211 having vertically extending slots 212 therethrough for receiving the axially extending stud 205. The inner end of each stud 205 carries a cam member 215 (Fig. 19) having an eccentric bore 216 and provided with a nut portion 217 for receiving a wrench to adjust the angular position of the cam on the stud 205. The cam 215 is adapted to seat on a shoulder 220 on the inner clamp member 211, and it is held in adjusted position on stud 205 by means of a handle 222 threaded on the end of the stud to clamp all of these parts together and thereby to secure the assembly on the shake rail, the handle 222 being shown as provided with a suitable washer 223. Thus since the direct support for the table roll unit is provided by the seated engagement of the cam 215 and shoulder 220 at each end of the roll, the vertical position of the roll is vertically adjusted by loosening handles 222 and then rotating cams 215 on studs 205 to raise or lower the axis of the table roll assembly, this adjustment being illustrated in Fig. 16 which shows the opposite ends of the roll in their respective limit positions.

Fig. 20 shows a table roll assembly 32a of modified construction particularly useful when the bearings 201 are of the water lubricated stainless steel type. The end member 203a is provided with a bore 225 extending through its stud portion 205a for connection by a suitable fitting 226 to a tube or hose 227 from a water supply, and the water is thus conducted to the space between the tubes 200 and 202 to lubricate the bearings 201. A nut 228 is substituted for the threaded handle 222, and the other parts are of similar construction to those shown in Fig. 16 and operate in the same manner to form a vertically adjusted fixed mounting for the end members 203a.

The inner clamp member 211 at each end of the table roll also includes a laterally extending portion which forms a support for the associated water deflector 33, the function of the deflector being to assure proper stripping of water from the table roll to prevent retransfer of the water to the wire and web. Referring to Figs. 16 and 23 each deflector 33 is Z-shaped, and its lower leg is welded to a hexagonal tube 230 supported at each end in a complementary slot 231 in the extension portion of the clamp member 211. The tube 230 is provided with a connection 232 (Fig. 22) to a source of pressure air, and it is formed with a discharge slit 234 arranged to discharge this air in a thin sheet directed substantially tangent to the adjacent table roll. The upper leg of each deflector extends upwardly at an angle into closely spaced relation below the wire as illustrated in Fig. 23, and this leg is shown as carrying a lip 235 engaging the underside of the wire, this lip being conveniently made of a material such as the fiber impregnated with urea formaldehyde sold under the trade name Formica.

In the operation of the machine, the table rolls rotate at the relatively high peripheral speed of the wire, in the direction indicated by the arrows in Fig. 23, and the stream of water draining from the wire onto the table rolls is subject to three significant forces, namely centrifugal force, gravity, and surface tension between the water and the surface of the roll. The centrifugal force acts to throw a large proportion of the water in the direction of the next table roll, as shown at 236 in Fig. 23, and if there were no partition between adjacent rolls, at least some of this water would strike the next roll and tend to be carried back to the wire. However, with the deflector 33 constructed and arranged as shown, such centrifugally discharged water will strike the deflector and then follow it down until it drains to the roof 55.

The provision of the pressure air discharge slit in the supporting tube for each deflector provides important advantageous results in operation. With this air discharged in a thin sheet tangentially of the adjacent roll, as indicated at 237 in Fig. 23, the air acts as a doctor to break surface tension of the water to the roll and thus effectively peels away such water for gravity drainage to the roof below. At the same time, this air flow creates a partial vacuum between each deflector and its adjacent table roll on the left as viewed in Fig. 23, which in turn creates suction effective to induce a downward flow of water from the wire into this space for draining to the truss roof. In addition, the construction and arrangement of the upper leg of the deflector with relation to the wire acts under the conditions of high speed travel of the wire to create a suction effect between the deflector and the adjacent table roll on its right as viewed in Fig. 1, which also aids in increasing rapid drainage from the wire during its entire passage across the table roll section.

This construction of the table rolls and their water deflectors and associated structure offers numerous practical advantages in operation. As already noted, the cams in the roll supports provide for quick and simple vertical adjustment of the individual rolls, and also the clamped mounting of each roll unit on the shake rails makes it a simple matter to remove or replace each roll unit. For example, if it is desired to vary the drainage action of the roll, the total number of rolls can be altered as desired, and the remaining rolls can be then readily adjusted lengthwise of the wire to the desired spacing for proper supporting action. In addition, since the connections from the outer tubes 200 to the shake rails are through the stationary inner tubes or shafts 202—203, there is minimum tendency towards binding of the bearings during shaking, with correspondingly reduced tendency to wear between the table rolls and the wire, and also the square or other non-circular shape for the shake rails facilitates a firm clamped connection with the brackets 209.

The suction boxes 34 are provided with a cantilevered mounting similar to that for the table roll section in order to facilitate wire changing. Referring to Fig. 24, each suction box includes a main enclosure 250 having a supporting end portion 251 at the back of the machine which is rotatably mounted on a shaft 252 carried by a stand 253. Tilting of the suction boxes with the table roll section is simplified if the shaft 252 is coaxial with the supporting shaft 66 for the table roll section, and shaft 252 is shown as hollow to provide a convenient connection from the several suction boxes to the pump or other suction source. The hollow shaft 252 may be slotted at 254 (Fig. 26) to connect with the interior of the supporting portion 251 of each suction box and may be welded or otherwise secured to the boxes to provide suction-tight connections. The open end of hollow shaft 252 is connected with an elbow 255 by a rotatable seal indicated generally at 256, and the closed end of the shaft is shown as rotatably supported at 257 on a suitable end stand 258, and elbow 255 forms a convenient connection to the suction pump (not shown).

The portions 251 of the suction boxes are tiltable on the axis of the hollow shaft 252, and the mechanism for effecting their tilting movement is shown as similar to that described for the table roll section and includes a cylinder 260 mounted on the stand 253, a latch member 262 and an operating cylinder 263 for the latch similar to the corresponding parts described in connection with Figs. 8 and 9. At the front side of the machine, each suction box has a bracket portion 265 adapted to seat on a crossbar or pipe 266 supported by a frame 267 having a pivotal mounting 268 on the floor or other stationary structure, providing for movement of the frame 267 out of the way when the suction box is tilted as described to raise its front end for wire changing.

The suction boxes 34 are shown in the drawings as of the construction disclosed in detail in the copending application of Farhang Javid, Serial No. 264,090, filed of even date herewith and assigned to the same assignee as this application, now Patent No. 2,728,273, granted December 27, 1955. Each suction box contains a plurality of continuously driven endless belts 270 arranged transversely of the direction of wire travel, with the belts forming the supporting surface for the underside of the wire and with the effective suction being applied through slots formed by spacing adjacent belts. As shown in Fig. 25, the belts are supported at the front end of the suction box on sheaves 271 carried by a shaft 272, and the belts are driven continuously at slow speed to present a constantly changing surface to the wire.

If all the belts 270 were driven in the same direction, they would tend to cause sidewise movement of the wire, and in order to provide for driving adjacent belts in opposite directions and thus to counteract such tendency, every other sheave 271 is freely rotatable on shaft 272 while the remaining sheaves are keyed to the shaft as shown. The reverse arrangement is employed at the opposite end of the suction box, with the belts which are driven from shaft 272 being supported on sheaves 273 freely rotatable on the shaft 274 and vice versa. Separate motors are provided for driving the shafts 272 and 274, one of these motors 275 being shown in Fig. 1 at the front of the machine, and the second motor being similarly mounted at the back of the machine. In order to provide for slow movement of the belts, for example at speeds of the order of one foot per minute, the motors 275 should be of the gearhead type or otherwise provided with suitable speed reduction means. Couplings 276 may be provided as indicated to facilitate individual removal of the suction boxes for repair or replacement.

The suction couch roll 35 is also provided with a cantilever type mounting for tilting with the rest of the wire section. Referring to Figs. 27 and 28, the bearing housing 280 at the back end of the couch roll is pivoted at 281 to the upper end of a stand 282, and the journal 283 extends through a further stand 285. A fluid pressure cylinder 286 is mounted at the upper end of stand 285 and operates through a lever 287 pivoted in the stand to depress the journal 283 and thus to rock the couch roll about its pivot 281 and raise its forward end.

The suction connection to the interior of roll 35 provided at the front of the machine, through a stand 290 and a removable section 291 bolted at 292 to the stand 290 and to the end housing 295 of the couch roll, which includes a passage 296 communicating with the suction chamber within the couch roll. For wire changing it is merely necessary to loosen the bolts 292 and remove the section 291, after which the application of pressure in cylinder 286 will cause the roll to tilt as described.

Figs. 29–33 show a modified construction of Fourdrinier machine constructed in accordance with the invention in which special provision is made to cause all the water draining from the web through the table rolls to be discharged at the back of the machine. The truss roof structure which supports the breast roll and the table rolls includes truss members 300 which are shown as constructed of tubing as described in connection with Figs. 5–7, with the top and bottom members in each truss arranged to incline upwardly and to converge towards the front of the machine so that the sheet metal roof 301 supported thereon is inclined from the front of the machine towards the back throughout its entire lateral extent. Also the front of the roof is flared upwardly at 302, and its side at the back of the machine includes a depending skirt 303 to direct the water draining from the web into the base member 305, which is shown as generally similar in construction to the base member 61 as previously described.

Each of the truss members 300 is secured at the back of the machine to a post 310 pivoted by means of a shaft 311 in ribbed portions 312 of the base member 305, and a tilting assembly indicated generally at 313 corresponds to the similar mechanism described in connection with Figs. 8 and 9. A leg 315 is secured in depending relation to the front of each truss member and is adapted to seat on the upper end of a correspondingly spaced base member 316, with the engaging ends of these parts being shown as formed with tongue and groove portions for increased stability, and the lower ends of the legs 315 are provided with bracing struts 317.

The shake rails 320 are supported on the posts 315 and the truss members 300 by flexible mountings 321, which may be of substantially the same construction described in connection with Fig. 10, and a shield 322 surrounds each mounting 321 at the back of the machine as shown. The table roll units indicated generally at 323 are also shown as of the construction previously described, and the mounting 324 for the breast roll 325 is also of substantially the same construction described in connection with Figs. 3 and 4. A shake mechanism 326 is shown as mounted on the base member 305 and connected through rods 327 with the shake rail at the back of the machine. The suction couch roll 328 and its mounting are shown as of essentially the same construction previously described in connection with Figs. 1, 27 and 28. A shield 329 may be provided along the back of the machine to deflect wash water directed across roof 301 from a wash-up hose at the front of the machine.

The suction box indicated generally at 330 is shown as similar to the suction box construction previously described in connection with Figs. 24–26, but instead of a plurality of boxes each containing a relatively small number of continuous belts, Fig. 29 shows the machine as including only a single box 330 incorporating a corresponding large plurality of continuous belts. The suction box 330 may be mounted at the back of the machine in substantially the same manner as described, and it is preferably connected with the longitudinal bracing of the truss frame as described in connection with suction boxes 34. At the front of the machine, suction box 330 includes a pair of depending legs 331 fitting corresponding supporting base members 316, and one of the legs 331 also cooperates with the rearward portion of the suction box to support the guide rolls 333. The legs 315 similarly cooperate with the posts 310 to support the guide rolls 335 and 336, while the lower guide roll 337 is supported by fixed stands 338.

The Fourdrinier machine of Fig. 29 also incorporates a modified construction of wire tensioning mechanism in accordance with the invention. Referring particularly to Figs. 31–33 a shaft 340 is supported on the base of the machine below the guide roll 335, and this shaft extends from front to back of the machine and supports a pair of elongated curved arms 341 at its opposite ends which are secured thereto for rotation therewith and in turn carry a stretch roll 343. A worm gear 345 is free on shaft 340 and is driven by a worm 346 from a motor 347. The gear 345 includes a hub portion 348 which carries an arm 350, and this arm is operatively connected with the adjacent arm 341 through a pressure cylinder or bellows 355 which corresponds structurally and functionally with the cylinder 155 as described in connection with Fig. 12 and correspondingly controls motor 347.

As shown in Fig. 32, the arms 341 may be swung downwardly to a retracted position in which the wire is released for lateral movement between rolls 335 and 343 for changing, and this arrangement does not require release of any of these parts in any other way. During operation of the machine, the arms 341 normally carry the roll 343 in approximately the position shown in Fig. 33 in which roll 343 cooperates with roll 335 and the adjacent roll 336 to maintain the proper tension in the wire, with the actual operating position at any given time being controlled by the tension in the wire acting through the pressure unit 351 in the same manner as described in connection with Fig. 12. It will aso be noted that since in this arrangement the roll 335 which acts as a stretch roll is also one of the guide rolls and is fixed with relation to the main frame of the machine, it may readily be driven as desired in properly synchronized relation with the couch roll to assist in proper driving of the wire, as by a separate synchronized motor or a belt drive from the couch roll as indicated diagrammatically at 360 in Fig. 32.

It will be apparent that this Fourdrinier machine as shown in Figs. 29–33 provides substantially the same advantages of structure and mode of operation as described in connection with Figs. 1–28, especially from the standpoint of light and rigid construction eliminating the usual heavy side beams and saveall trays. The machine of Figs. 29 and 30 also offers the additional advantage that all the water draining from the web as it crosses the table rolls is discharged to the back of the machine, and the front of the machine is maintained free of structural supports and the like other than the simple leg arrangement shown so that the attendants have unobstructed access to the front of the machine at all times. It will also be apparent that this machine possesses the same advantages from the standpoint of ease of wire changing as previously described, the lightweight truss roof construction being especially adapted for cantilevered mounting without the necessity for jacks or other heavy temporary or permanent structural supports.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. In a Fourdrinier paper machine having a continuous forming wire and a breast roll over which the wire runs, releasable supporting apparatus for the breast roll comprising a main frame, brackets at one end of said frame, slideways on said brackets arranged to incline upwardly away from said frame, bearing blocks for the breast roll, said blocks engaging said slideways for sliding movement thereon in the direction of inclination thereof towards and away from said frame to change the spacing of the breast roll from said frame with resulting slackening and tightening of the wire, and means on said brackets for causing controlled movement of said blocks on said slideways.

2. In a Fourdrinier paper machine having a continuous forming wire and a breast roll over which the wire runs, releasable supporting apparatus for the breast roll comprising a main frame, brackets at one end of said frame, slideways on said brackets arranged to incline upwardly away from said frame, bearing blocks for the breast roll supported for sliding movement on said slideways towards and away from said frame to change the spacing of the breast roll from said frame with resulting slackening and tightening of the wire, and fluid pressure cylinders on said brackets for effecting controlled sliding movement of said blocks on said slideways.

3. In a Fourdrinier paper machine having a continuous forming wire and a breast roll over which the wire runs, releasable supporting apparatus for the breast roll comprising a main frame, brackets at one end of said frame, slideways on said brackets arranged to incline upwardly away from said frame, bearing blocks for the breast roll, said blocks engaging said slideways for sliding movement thereon in the direction of inclination thereof towards and away from said frame to change the spacing of the breast roll from said frame with resulting slackening and tightening of the wire, means on said bracket for causing controlled movement of said blocks on said slideways, and releasable members on said brackets for engagement with said blocks to lock said blocks in substantially the uppermost positon thereof and of the breast roll.

4. In a Fourdrinier paper machine, the combination of a main frame, a plurality of table rolls for supporting the Fourdrinier wire, a pair of supporting rails for said table rolls extending along the front and back sides of said machine respectively and secured to said frame, a bracket for securing each end of each said table roll to one of said rails, each said bracket including complementary clamping members adapted for clamping engagement with said rail to form a fixed and rigid mounting for said table roll on said rail, means for releasing said clamping members to provide for adjustment of said table rolls longitudinally of said rails, means including bearings supporting each said table roll on a pair of said brackets for rotation with respect thereto, each said bracket including an extension portion, a water deflector extending laterally of said machine and associated with each said table roll, and each said deflector and said bracket extension having cooperating portions supporting said deflector in predetermined relation with the associated said table roll to maintain said roll and said deflector in said predetermined relation when said brackets are adjusted on said rail.

5. In a Fourdrinier paper machine having a continuous forming wire and a plurality of table rolls over which the wire runs, the combination of a water deflector positioned between adjacent said table rolls, said deflector including a tubular member extending generally parallel with said rolls, said tubular member having an opening therein facing the lower portion of the upwardly rotating surface of the next adjacent said table roll in the direction of wire travel, and means for supplying air under pressure to the interior of said tubular member for discharge through said opening against said table roll surface to doctor water from said surface.

References Cited in the file of this patent

UNITED STATES PATENTS

| | | |
|---|---|---|
| 508,947 | Kleinstiver | Nov. 21, 1893 |
| 541,336 | Savery | June 18, 1895 |
| 703,714 | Warner | July 1, 1902 |
| 813,820 | Packer | Feb. 27, 1906 |
| 850,698 | Warnock | Apr. 16, 1907 |
| 1,586,204 | Lamourux | May 25, 1926 |
| 2,039,780 | Darby | May 5, 1936 |
| 2,111,833 | Berry | Mar. 22, 1938 |
| 2,118,491 | Chuse | May 24, 1938 |
| 2,255,951 | Tomtlund | Sept. 16, 1941 |
| 2,283,871 | Norelius | May 19, 1942 |
| 2,290,883 | Knox | July 28, 1942 |
| 2,360,773 | Helin | Oct. 17, 1944 |
| 2,372,764 | Clem et al. | Apr. 3, 1945 |
| 2,484,473 | Staege | Oct. 11, 1949 |
| 2,541,080 | Lyon | Feb. 13, 1951 |
| 2,634,658 | Fasoli | Apr. 14, 1953 |

FOREIGN PATENTS

| | | |
|---|---|---|
| 126,154 | Germany | Dec. 6, 1901 |
| 619,609 | Great Britain | Mar. 11, 1949 |